(12) United States Patent
Lee et al.

(10) Patent No.: US 9,914,363 B2
(45) Date of Patent: Mar. 13, 2018

(54) METHOD FOR WIRELESSLY RECHARGING ELECTRIC VEHICLE USING VISIBLE LIGHT COMMUNICATION AND VEHICLE FOR CARRYING OUT THE SAME

(71) Applicant: HYUNDAI MOTOR COMPANY, Seoul (KR)

(72) Inventors: So Jin Lee, Suwon-si (KR); Ji Hwon Kim, Gwangmyeong-si (KR); Chang Min Yang, Bucheon-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 224 days.

(21) Appl. No.: 14/795,780

(22) Filed: Jul. 9, 2015

(65) Prior Publication Data

US 2016/0185236 A1 Jun. 30, 2016

(30) Foreign Application Priority Data

Dec. 24, 2014 (KR) ........................ 10-2014-0188474

(51) Int. Cl.
*H02J 7/00* (2006.01)
*B60L 11/18* (2006.01)
*H02J 50/90* (2016.01)
*H02J 50/80* (2016.01)

(52) U.S. Cl.
CPC ......... *B60L 11/182* (2013.01); *B60L 11/1846* (2013.01); *H02J 50/80* (2016.02); *H02J 50/90* (2016.02); *Y02T 10/7005* (2013.01); *Y02T 10/7072* (2013.01); *Y02T 90/121* (2013.01); *Y02T 90/122* (2013.01); *Y02T 90/128* (2013.01); *Y02T 90/14* (2013.01); *Y02T 90/16* (2013.01); *Y02T 90/163* (2013.01); *Y02T 90/169* (2013.01); *Y04S 30/14* (2013.01)

(58) Field of Classification Search
CPC ...................................................... B60L 11/182
USPC .................................................. 320/108, 109
See application file for complete search history.

(56) References Cited

U.S. PATENT DOCUMENTS

| | | | |
|---|---|---|---|
| 2011/0082612 A1* | 4/2011 | Ichikawa | B60L 11/182 701/22 |
| 2012/0239571 A1* | 9/2012 | Boot | B60L 11/1816 705/44 |

FOREIGN PATENT DOCUMENTS

| | | |
|---|---|---|
| JP | 2010103851 A | 5/2010 |
| JP | 2010193261 A | 9/2010 |
| JP | 2012-196129 A | 10/2012 |
| KR | 10-2011-0082185 A | 7/2011 |
| KR | 2012-0087771 A | 8/2012 |
| KR | 10-2013-0018180 A | 2/2013 |
| KR | 10-2014-0048502 A | 4/2014 |

* cited by examiner

*Primary Examiner* — Richard V Muralidar
(74) *Attorney, Agent, or Firm* — McDermott Will & Emery LLP

(57) ABSTRACT

Disclosed is a method for efficiently retrieving a charger to supply electric power to an electric vehicle and achieving maximum wireless recharging efficiency, using visible light communication, upon wirelessly recharging the electric vehicle. Wireless visible light communication can be realized, using the existing head lamp installed at the vehicle. Accordingly, it is unnecessary to provide separate communication equipment. In addition, enhanced physical security, efficient charger retrieval, and maximum wireless recharging efficiency can be achieved by virtue of straightness of light.

15 Claims, 3 Drawing Sheets

FIG. 2
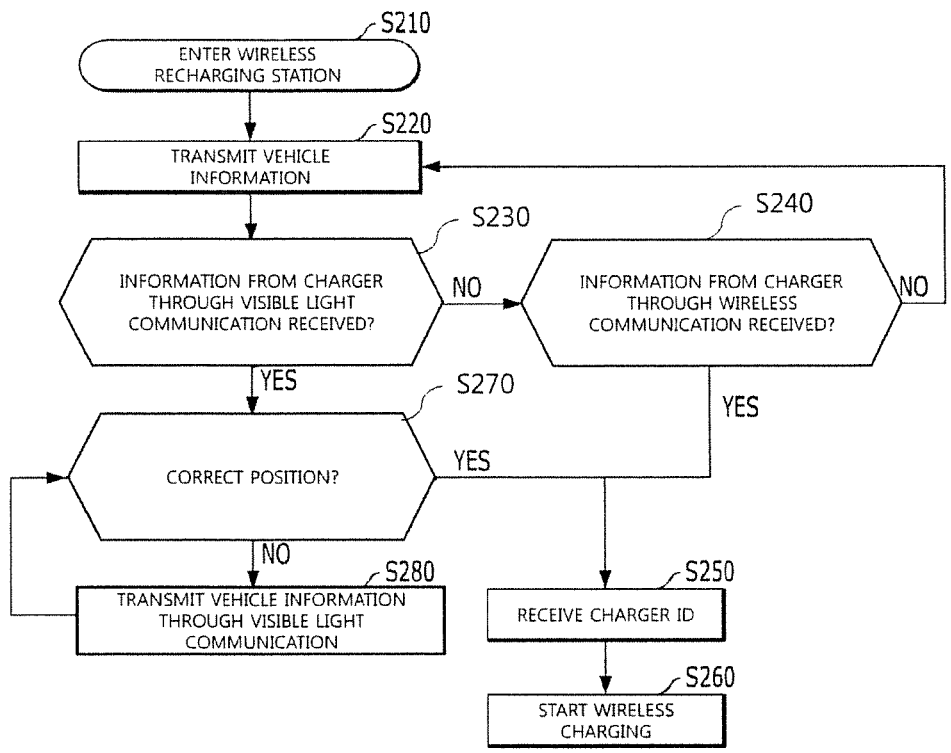
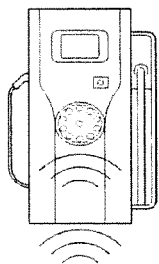
FIG. 3A
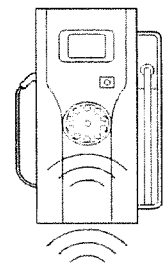
FIG. 3B
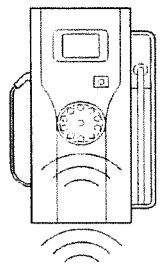
FIG. 3C

METHOD FOR WIRELESSLY RECHARGING ELECTRIC VEHICLE USING VISIBLE LIGHT COMMUNICATION AND VEHICLE FOR CARRYING OUT THE SAME

CROSS-REFERENCE TO RELATED APPLICATION

This application claims the benefit of the Korean Patent Application No. 10-2014-0188474, filed on Dec. 24, 2014, which is hereby incorporated by reference as if fully set forth herein.

BACKGROUND OF THE INVENTION

Field of the Invention

The present invention relates to a method for effectively wirelessly recharging an electric vehicle using visible light communication and a vehicle capable of carrying out the same.

Discussion of the Related Art

A wireless recharging system for an electric vehicle is a system for recharging a battery of a vehicle without requiring cable connection under the condition that the vehicle is parked at a particular location. Such a wireless recharging system uses an electromagnetic induction method using coils or a method using resonance. In this case, however, the distance between the coil of the electric vehicle and the coil of the charger should be within a certain range in order to enable recharging of the electric vehicle using the above-mentioned method. When the electric vehicle moves outside of the range, recharging efficiency may be abruptly reduced and, as such, an excessive financial burden may be imposed on the user, as compared to the amount of recharge.

Currently, there is no wireless recharging system commercially available for electric vehicles although such a wireless recharging system is being developed by some companies. In order to eliminate problems obstructing commercial availability of such a wireless recharging system, it is necessary to secure desired wireless recharging efficiency, and to complement a charger retrieval procedure for communication with a charger to execute wireless recharge. Although the charger retrieval procedure should be necessarily executed for exchange of billing information, there is a problem in that, when there is a plurality of wireless chargers, to simultaneously recharging a plurality of vehicles, it is difficult for each vehicle to designate a corresponding one of the wireless chargers to supply electric power thereto through general wireless connection in order to automatically connect the corresponding wireless charger thereto.

Such a problem will be described with reference to FIG. 1.

FIG. 1 is a view explaining a problem occurring when a plurality of electric vehicles is simultaneously recharged in a wireless manner.

Referring to FIG. 1(A), in a wired recharging system, an electric vehicle 110 is connected to a charger 120 via a power line in a wired manner. In this case, the possibility of mismatch between the vehicle 110 and the charger 120 in setting of a recharging amount and exchange of billing information is very low because communication between the vehicle 110 and the charger 120 can be achieved through power line communication (PLC).

However, there may be a situation that two vehicles 110A and 110b are simultaneously recharged in a wireless manner in a recharging station provided with a plurality of wireless chargers 131, 132, and 133, as shown in FIG. 1(B). In this case, it may be assumed that electric power is supplied to the left vehicle 110A through the left charger 131 while being supplied to the right vehicle 110B through the right charger 133 under the condition that there is no physical connection between the corresponding vehicle and charger. In this regard, setting of a recharging amount and exchange of billing information must also be carried out in a wireless manner. However, when charger-and-vehicle connection is simply achieved based on intensities of wireless signals, there may be an occasion that the left vehicle 110A is wirelessly connected to the right charger 133, and the right vehicle 110B is wirelessly connected to the left charger 131 and, as such, billing information may be mistaken between the two chargers. For this reason, correct charger retrieval is required.

SUMMARY OF THE INVENTION

Accordingly, the present invention is directed to a method for wirelessly recharging an electric vehicle using visible light communication and a vehicle for carrying out the same that substantially obviate one or more problems due to limitations and disadvantages of the related art.

An object of the present invention is to provide a retrieval method between a vehicle and a charger in order to achieve efficient and correct connection between the vehicle and the charger, which currently execute recharging operation.

Additional advantages, objects, and features of the embodiments will be set forth in part in the description which follows and in part will become apparent to those having ordinary skill in the art upon examination of the following or may be learned from practice of the embodiments. The objectives and other advantages of the embodiments may be realized and attained by the structure particularly pointed out in the written description and claims hereof as well as the appended drawings.

To achieve these objects and other advantages and in accordance with the purpose of the embodiments, as embodied and broadly described herein, a wireless recharging system of a vehicle includes a light emitter operating as a transmitting stage of visible light communication recognized by a wireless charger, a wireless charging unit for receiving electric power from the wireless charger, a wireless communication unit for transmitting and receiving data to and from the wireless charger in a wireless manner, and a controller for performing a control operation to transmit identification information of the wireless communication unit to a light receiver of the wireless charger via the light emitter, a control operation to receive, from the wireless charger, information of the wireless charger when the wireless charger is connected to the wireless communication unit, using the identification information, and a control operation to start wireless recharging through the wireless charging unit, using the information of the wireless charger.

In another aspect of the present invention, a method for controlling a wireless recharging system of a vehicle includes transmitting identification information of a wireless communication unit to a light receiver of a wireless charger via a light emitter, receiving, from the wireless charger, information of the wireless charger when the wireless charger is connected to the wireless communication unit, using the identification information, and starting wireless recharging through the wireless charging unit, using the information of the wireless charger.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and along with the description serve to explain the principle of the invention. In the drawings:

FIG. 2 is a flowchart illustrating an example of a procedure of connecting a vehicle to a wireless charger, using visible light communication, in accordance with an embodiment of the present invention;

FIG. 3A, FIG. 3B, and FIG. 3C are views illustrating an example of a procedure of guiding a vehicle to a correct parking position, using visible light communication, in accordance with an embodiment of the present invention.

DETAILED DESCRIPTION OF THE INVENTION

Figure 1A:
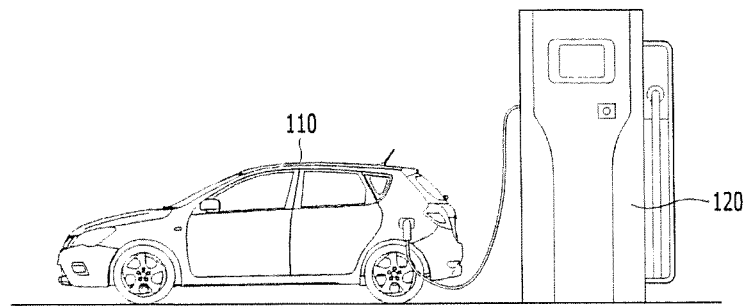
FIG. 1A and FIG. 1B are views explaining a problem occurring when a plurality of electric vehicles is simultaneously recharged in a wireless manner.
Figure 1B:
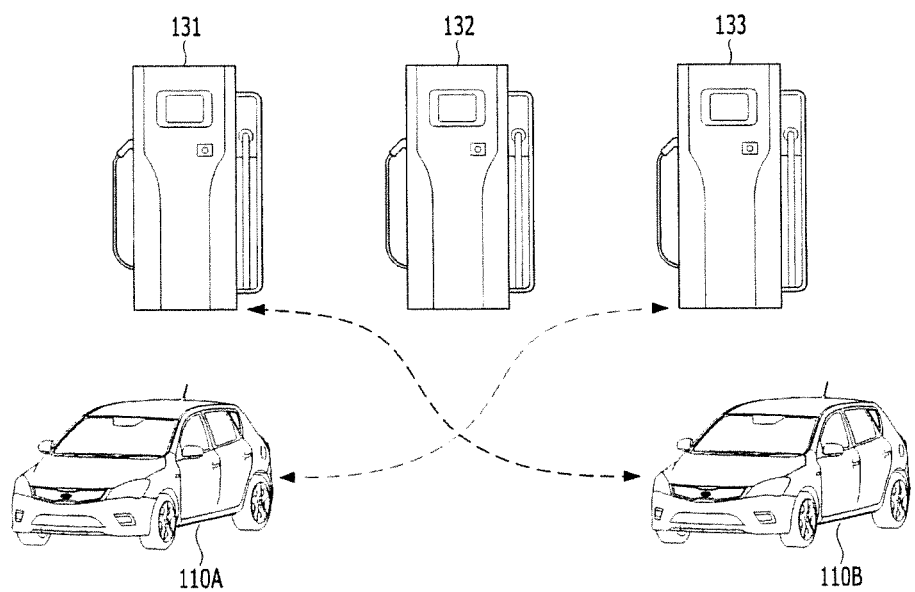

Hereinafter, preferred embodiments of the present invention will be described in detail with reference to the accompanying drawings, and the same or similar elements are designated by the same reference numerals regardless of the numerals in the drawings and redundant description thereof will be omitted. The suffixes "module" and "unit" of elements herein are used for convenience of description and thus can be used interchangeably and do not have any distinguishable meanings or functions.

In the following description of the present invention, a detailed description of known functions and configurations incorporated herein will be omitted when it may obscure the subject matter of the present invention. Meanwhile, while the present invention is susceptible to various modifications and alternative forms, specific embodiments thereof are shown by way of example in the drawings and will herein be described in detail. It should be understood, however, that there is no intent to limit the present invention to the particular forms disclosed. On the contrary, the present invention covers all modifications, equivalents, and alternatives falling within the spirit and scope of the present invention.

In the present invention, it is proposed that visible light communication based on straightness of light be utilized in order to achieve parking of a vehicle at a correct location for retrieval of a correct charger and maximization of wireless recharging efficiency.

Visible light communication is a wireless communication technology for transmitting information in a wireless manner, using light of a visible wavelength range that is visible to the naked eye. Such visible light wireless communication technology is distinguished from existing wired optical communication technologies and infrared wireless communication technologies because light of a visible wavelength range is used. The visible light wireless communication technology is also distinguished from wired light communication technologies because communication is carried out in a wireless environment. Furthermore, the visible light wireless communication technology is convenient in that it can be freely utilized without any restriction or permission in terms of use of frequencies, as compared to radio frequency (RF) wireless communication technologies. In addition, it may be possible to enhance physical security by virtue of straightness of light as mentioned above. It may also be possible to achieve retrieval of a correct charger and maximum wireless recharge efficiency, using such light straightness. As an example of a visible light emitter for visible light wireless communication, there is a light emitting diode which has been widely used in head lamps, signal lamps, etc. of vehicles in recent years.

Visible light wireless communication may be divided into two methods in accordance with whether or not there is a light receiver for visible light communication. When there is no light receiver in a vehicle, a charger attempts wireless connection to the vehicle, using information transmitted from the vehicle. In this case, the vehicle receives information from the charger, and then carries out wireless recharging. On the other hand, if there is a light receiver in the vehicle, the vehicle may additionally execute a procedure of receiving a guide signal to guide the vehicle to be accurately parked on a coil pad from the charger through visible light communication. When information of the charger is received in addition to the guide signal, the vehicle may attempt wireless connection to the charger.

Hereinafter, the above-described procedure will be described in more detail with reference to FIG. 2.

FIG. 2 is a flowchart illustrating an example of a procedure of connecting a vehicle to a wireless charger, using visible light communication, in accordance with an embodiment of the present invention.

First, the case in which there is no light receiver in a vehicle will be described.

When the vehicle enters a wireless recharging station (S210), the driver parks the vehicle at a location corresponding to a desired wireless charger (namely, on a charging pad or in front of a light receiver for visible light communication of the wireless charger). Thereafter, the driver may input a wireless charging command to the vehicle.

In response to the wireless charging command, the vehicle may transmit, via a light emitting device, for example, an LED, a connection signal to the light receiver for visible light communication of the wireless charger to execute wireless recharging under the condition that identification information of the vehicle is included in the connection signal (S220). Here, the identification information may include a vehicle identification number, an address of a Bluetooth device (BD_ADDR), a Wi-Fi media access control (MAC) address, access passwords according to respective communication schemes, etc.

Since there is no light receiver for visible light communication in the vehicle, the vehicle cannot receive visible light for communication transmitted from the wireless charger (S230), the charger directly attempts wireless connection to the vehicle, using the identification information of the vehicle (S240).

When wireless connection is successful, the vehicle receives information of the charger in a wireless manner (S250). Accordingly, the vehicle and charger may carry out setting of a recharging amount and exchange of billing information, and may then start charging (S260).

Through the above-described procedure, it may be possible to achieve accurate matching between the vehicle and the charger. When this method is used, it is unnecessary to provide a light receiver for visible light communication at the vehicle. In addition, there is an advantage in that it is unnecessary to provide a separate light emitter for transmission of wireless communication identification because the LED of the existing headlight is utilized for wireless communication identification. Furthermore, when the light receiver of the wireless charger is arranged at a position where the light receiver of the wireless charger can receive light from the headlight of the vehicle only when the vehicle is accurately parked on a charging pad, at which a coil of the charger is installed, the user may recognize that the vehicle has been parked at a location where efficient recharging is impossible, when wireless connection cannot be achieved.

Next, the case in which there is a light receiver in the vehicle will be described.

When a light receiver is provided at the vehicle, the vehicle can receive a signal transmitted from the charger through visible light communication at S230. When the parked position of the vehicle with respect to the charging pad is incorrect (S270), the signal transmitted from the charger may include guide information as to correct position (namely, direction/distance required for additional movement). Transmission of such guide information may be repeatedly executed until the vehicle is completely moved to the correct position (S280).

In this case, left and right headlights of the vehicle may transmit different identification information for determination of whether the vehicle has been parked at the correct position. A procedure of guiding the vehicle to the correct parking position using the above-described method will be described with reference to FIG. 3.

FIG. 3 illustrates an example of a procedure of guiding the vehicle to a correct parking position, using visible light communication, in accordance with an embodiment of the present invention.

In FIG. 3, it is assumed that the charging pad is arranged in front of the light receiver of the wireless charger.

When the vehicle is positioned right with respect to the light receiver of the wireless charger, as illustrated in FIG. 3(a), the light receiver only receives identification information representing the left headlight. In this case, the wireless charger may transmit, to the vehicle, information requesting the vehicle to move left.

On the other hand, when the vehicle is positioned left with respect to the light receiver of the wireless charger, as illustrated in FIG. 3(b), the light receiver only receives identification information representing the right headlight. In this case, the wireless charger may transmit, to the vehicle, information requesting the vehicle to move right.

Meanwhile, when the light receiver can receive identification information from both headlights through visible light communication, as illustrated in FIG. 3(c), the wireless charger may then attempt wireless connection to the vehicle, using the identification information previously transmitted from the vehicle (S230) or may transmit charger information to the vehicle through visible communication (S250), to enable the vehicle to attempt wireless connection to the charger. Alternatively, once the vehicle is parked at the correct position, the charger and the vehicle may establish wireless connection to carry out setting of a recharging amount and exchange of billing information. And then, wireless charging the vehicle may be started (S260).

Hereinafter, the configuration of an apparatus for carrying out the above-described methods will be described.

Figure 4:
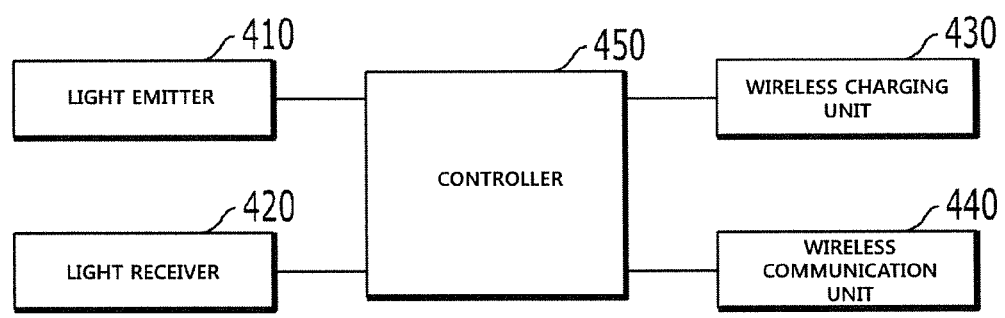
FIG. 4 is a block diagram illustrating an example of a recharging system in an electric vehicle according to an embodiment of the present invention.

FIG. 4 is a block diagram illustrating an example of a recharging system in an electric vehicle according to an embodiment of the present invention.

Referring to FIG. 4, the recharging system of the electric vehicle according to the illustrated embodiment of the present invention may include a light emitter 410, a light receiver 420, a wireless charging unit 430, a wireless communication unit 440, and a controller 450 for generally controlling operations of the above-described constituent elements.

The light emitter 410 may function as a transmitter in execution of visible light communication. When the headlights of the vehicle are constituted by LEDs, they may also perform the light emitter function. When the headlights are of a bulb type, a projection type, or a high intensity discharge (HID) type, differently than an LED type, separate LEDs may be provided.

The light receiver 420 of the recharging system of the electric vehicle may function as a receiver in execution of visible light communication. In some cases, the light receiver 420 may be omitted.

The wireless charging unit 430 may include an electric power receiver for receiving electric power in a wireless manner, a main battery, and a battery charger for recharging the main battery with electric power received via the electric power receiver. The electric power receiver may be embodied as a charging pad including a coil.

The wireless communication unit 440 executes exchange of data with the wireless charger through wireless connection using a wireless communication technology such as Wi-Fi or Bluetooth.

The controller 450 controls the light emitter 410 to transmit, to the wire less charger, identification information required for the wireless charger to attempt connection to the wireless communication unit 440. The controller 450 may also output information corresponding to position guide information received from the light receiver 420 through a cluster (not shown) or an audio-video navigation (AVN) system (not shown). In addition, the controller 450 may receive charger information via the light receiver 420, and may control wireless connection to the wireless charger via the wireless communication unit 440, using the received charger information. The controller 450 may also execute various determination and calculation according to the above-described embodiments, and may control other constituent elements associated therewith.

The above-described embodiments of the present invention can be realized as code, which can be written on a recording medium that can be read by a processor equipped in the home appliance and can be read by a processor. The recording medium that can be read by a processor includes all kinds of recording media, on which data that can be read by a processor is written, such as a hard disk drive (HDD), a solid state disk (SSD), a silicon disk drive (SDD), a read only memory (ROM), a random access memory (RAM), a CD-ROM, a magnetic tape, a floppy disk, an optical data storage, and a carrier wave type (e.g., transmission over the Internet).

In accordance with at least one embodiment of the present invention, the following effects are provided.

Since retrieval of a wireless charger is carried out in a vehicle to be wirelessly recharged, through visible light communication, correct matching of the vehicle with the wireless charger may be achieved and, as such, wireless connection between the vehicle and the wireless charger may be achieved.

In addition, it may be possible to achieve correct guidance to a recharging position and enhanced security by virtue of straightness of visible light communication.

It will be appreciated by persons skilled in the art that the effects that can be achieved through the present invention are not limited to what has been particularly described hereinabove and other advantages of the present invention will be more clearly understood from the above detailed description.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A wireless recharging system for use in a vehicle which is capable of being engaged with a wireless charger, comprising:
    a light emitter equipped in the vehicle and configured to transmit a visible light to a wireless charger to thereby inform the wireless charger of a vehicle position for wireless charging;
    a wireless charging unit for receiving electric power from the wireless charger;
    a wireless communication unit for transmitting and receiving data to and from the wireless charger in a wireless manner; and
    a controller for performing a control operation to transmit identification information of the wireless communication unit to a light receiver of the wireless charger via the light emitter, a control operation to receive, from the wireless charger, information of the wireless charger when the wireless charger is connected to the wireless communication unit, using the identification information, and a control operation to start the wireless charging through the wireless charging unit, using the information of the wireless charger.

2. The wireless recharging system according to claim 1, further comprising:
    a light receiver equipped in the vehicle and configured to receive visible light guide information about a predetermined parking position from the wireless charger to induce the vehicle into the predetermined parking position.

3. The wireless recharging system according to claim 2, wherein the light emitter comprises a first light emitter arranged at a left side of a front portion of the vehicle, and a second light emitter arranged at a right side of the front portion of the vehicle, each light emitter emitting visible light have unique identification information.

4. The wireless recharging system according to claim 3, wherein:
    the controller performs a control operation to further transmit first identification information corresponding to the first light emitter to the light receiver of the wireless charger via the first light emitter; and
    the controller performs a control operation to further transmit second identification information corresponding to the second light emitter to the light receiver of the wireless charger via the second light emitter.

5. The wireless recharging system according to claim 4, wherein the light receiver of the wireless recharging system of the vehicle recognizes the guide information composed by the wireless charger using at least one of the received first identification information and second identification information.

6. The wireless recharging system according to claim 1, wherein the light emitter comprises a headlight having at least a portion constituted by a light emitting diode (LED).

7. The wireless recharging system according to claim 1, wherein the identification information of the wireless communication unit comprises at least one of a Bluetooth device address (BD_ADDR), a Wi-Fi media access control (MAC) address, and a wireless access password.

8. A method for controlling a wireless recharging system for use in a vehicle which is capable of being engaged with a wireless charger, comprising:
    transmitting a visible light to a wireless charger via a light emitter to thereby inform the wireless charger of a vehicle position for wireless charging;
    receiving, from the wireless charger, information of the wireless charger when the wireless charger is connected to the vehicle; and
    starting the wireless charging through the wireless charging unit, using the information of the wireless charger.

9. The method according to claim 8, further comprising:
    receiving visible light guide information about a predetermined parking position from the wireless charger via a light receiver of the vehicle to induce the vehicle into the predetermined parking position.

10. The method according to claim 9, wherein the light emitter comprises a first light emitter arranged at a left side of a front portion of the vehicle, and a second light emitter arranged at a right side of the front portion of the vehicle, each light emitter emitting visible light have unique identification information.

11. The method according to claim 10, wherein the transmitting the identification information of the wireless communication unit to the light receiver of the wireless charger comprises:
    transmitting first identification information corresponding to the first light emitter to the light receiver of the wireless charger via the first light emitter; and
    transmitting second identification information corresponding to the second light emitter to the light receiver of the wireless charger via the second light emitter.

12. The method according to claim 11, wherein the light receiver of the wireless recharging system of the vehicle recognizes the guide information composed by the wireless charger using at least one of the received first identification information and second identification information.

13. The method according to claim 8, wherein the light emitter comprises a headlight having at least a portion constituted by a light emitting diode (LED).

14. The method according to claim 8, wherein the identification information of the wireless communication unit comprises at least one of a Bluetooth device address (BD_ADDR), a Wi-Fi media access control (MAC) address, and a wireless access password.

15. A vehicle including a battery system capable of being charged through a wireless charger, comprising:
    a parking position adjuster configured to transmit to and receive from the wireless charger visible light regarding vehicle's position and wireless charger's position to thereby share the vehicle's position and the wireless charger's position with each other and induce the vehicle into a predetermined parking position for wireless charging;
    a wireless charging unit for receiving electric power from the wireless charger;
    a wireless communication unit for transmitting and receiving data to and from the wireless charger in a wireless manner; and a controller for performing a control operation to transmit identification information of the wireless communication unit to a light receiver of the wireless charger via the parking position adjuster, a control operation to receive, from the wireless charger, information of the wireless charger when the wireless charger is connected to the wireless communication unit, using the identification information, and a control operation to start the wireless charging through the wireless charging unit, using the information of the wireless charger.

* * * * *